United States Patent
Hill

(10) Patent No.: US 7,206,511 B1
(45) Date of Patent: Apr. 17, 2007

(54) OPTICAL COMMUNICATIONS SYSTEM

(75) Inventor: Alan M Hill, Suffolk (GB)

(73) Assignee: British Telecommunications public limited company, London (GB)

( * ) Notice: Subject to any disclaimer, the term of this patent is extended or adjusted under 35 U.S.C. 154(b) by 473 days.

(21) Appl. No.: 10/110,980

(22) PCT Filed: Nov. 17, 2000

(86) PCT No.: PCT/GB00/04400

§ 371 (c)(1),
(2), (4) Date: Apr. 19, 2002

(87) PCT Pub. No.: WO01/37472

PCT Pub. Date: May 25, 2001

(30) Foreign Application Priority Data

Nov. 19, 1999 (EP) .................................. 99309235

(51) Int. Cl.
*H04J 14/00* (2006.01)
(52) U.S. Cl. ..................... 398/71; 398/47; 398/153; 398/168
(58) Field of Classification Search ............... 398/2, 398/5, 19, 20, 47, 53, 67, 99, 102, 145, 153, 398/154, 156, 168, 70, 71
See application file for complete search history.

(56) References Cited

U.S. PATENT DOCUMENTS

| 5,754,555 A | 5/1998 | Hurme et al. |
| 5,760,935 A * | 6/1998 | Sabry et al. ................... 398/75 |
| 5,815,295 A | 9/1998 | Darcie et al. |
| 5,864,414 A | 1/1999 | Barnsley et al. |

FOREIGN PATENT DOCUMENTS

| EP | 0 614 291 A | 9/1994 |
| EP | 0 896 447 A | 2/1999 |
| WO | 95 26592 A | 10/1995 |

OTHER PUBLICATIONS

Seo S -W et al, "Transparent Optical Networks With Time-Division Multiplexing", IEEE Journal on Selected Areas in Communications, US, IEEE Inc. New York, vol. 14, NR. 5, pp. 1039-1051 XP000590732.

Huang et al., "A Multicast Model for WDM-Based Local Lightwave Networks With a Passive Star Topology", Proceedings of the Region Ten Conference (TENCON), CN, Geijing, IAP, 1993, pp. 470-473, XP000521464.

Nen-Fu Huang et al., "A multicast Model for WDM-based Local Lightwave Networks with a Passive Star Topology", Proceedings of the Region Ten Conference (TENCON), Beijing, Oct. 19-21, 1993, XP010114103.

* cited by examiner

*Primary Examiner*—Jason Chan
*Assistant Examiner*—Nathan Curs
(74) *Attorney, Agent, or Firm*—Nixon & Vanderhye P.C.

(57) ABSTRACT

A passive optical network employs wavelength-dependent routing, and terminals that transmit request packets (requesting a data transmission slot) in a common signalling time slot. Different delays are then applied to packets on different wavelength channels, allowing a number of request packets to be processed in sequence by a single optical receiver at the network controller.

13 Claims, 5 Drawing Sheets

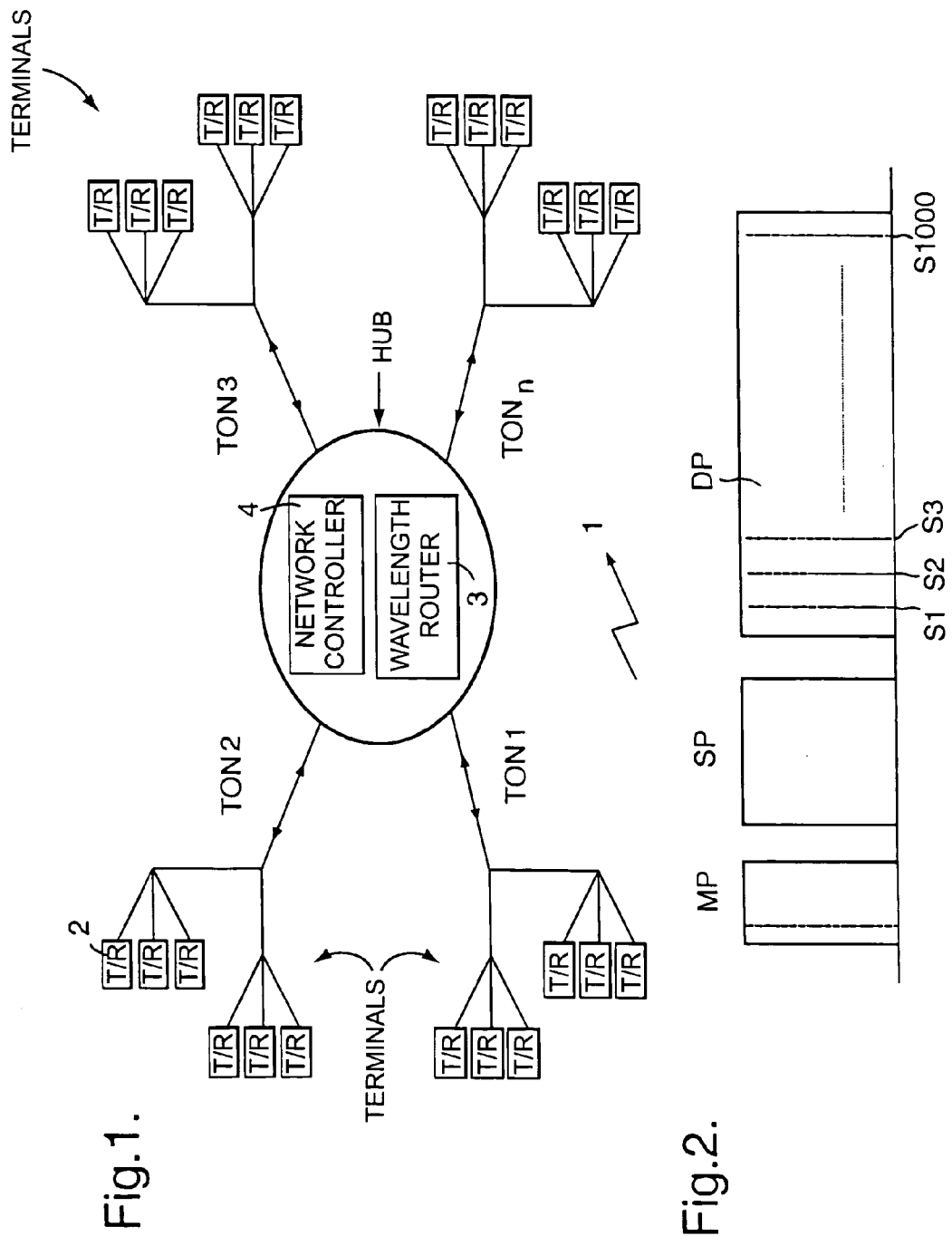

OPTICAL COMMUNICATIONS SYSTEM

BACKGROUND

1. Technical Field

The present invention relates to an optical communications system suitable for carrying broadband communications traffic.

2. Related Art

Optical communications networks potentially offer very high capacities. However, in practice it has proved difficult to design appropriate switching technologies to realise the full potential of optical communications networks. Optoelectronic switching designs limit the bit-rate that can be handled by the network. Control and management of the switching function also provides further difficulties and there is a need to minimise software costs for call processing, network intelligence, network management and service management.

The present applicant's earlier international patent application WO 95/26592, to which the reader is directed for useful technical background, describes and claims an optical communications system in which a number of terminals are interconnected via passive optical networks (PONs) and by a wavelength-dependent router at the hub of the network. Each terminal includes means, such as a tuneable transmitter and receiver, that allows it to select one of a number of different wavelength channels for transmission and reception in different time slots. In this way, the switching function is distributed to the edges of the network, while the core of the network functions using partially or entirely passive routing devices. This overcomes many of the problems discussed above. However, there is a problem in that distributing the switching function to the edges of the network potentially imposes a large signalling overhead for the transmission of network control information such as bandwidth or packet requests and a resource allocation map indicating the wavelength channels and time slots allocated to each request.

BRIEF SUMMARY

According to a first aspect of the present invention, there is provided a method of operating an optical communications system comprising a wavelength-dependent optical router, a plurality of terminals, each terminal including at least one wavelength-tuneable optical transmitter at least one passive optical network interconnecting the plurality of terminals via the wavelength-dependent optical router, and a network controller, the method including:

a) transmitting data time-slot request packets from the plurality of terminals on a number of different wavelength channels in a common signalling time slot within a data transmission frame b) applying different respective delays in the optical domain to slot request packets on different wavelength channels thereby creating one or more time-series of request packets c) receiving a time-series of slot request packets at a common optical receiver;

d) at the network controller, processing requests received from the optical receiver and allocating transmission slots in the subsequent data transmission fame to terminals.

There is a need to maximise the efficiency of signalling in the upstream direction, that is from the terminals to the network controller. The present inventor has found that by using one or more common time slots within the transmission frame, but then applying time delays to allow different request packets to be detected at a common receiver, the allocation of data slots is simplified, whilst minimising the cost and complexity of the detection system required by the controller. Furthermore, the resulting high degree of upstream signalling efficiency enables greater flexibility of signalling requests to be made by the terminals. In preferred implementations, a terminal may request data slots or packets to a plurality of different destination terminals within each transmission frame, limited only by the availability of data slots in that frame.

According to a second aspect of the present invention, there is provided a method of operating an optical communications system comprising a wavelength-dependent optical router, a plurality of terminals, each terminal including at least one wavelength-tuneable optical receiver, at least one passive optical network interconnecting the plurality of terminals via the wavelength-dependent optical router, and a network controller including a plurality of optical transmitters, the method including:

(a) generating control signals, for transmission from the network controller to the terminals, in different sub-frames within a downstream signalling frame, and (b) applying different respective delays to control signals generated in different respective sub-frames thereby aligning all the sub-frames in the time domain.

According to a third aspect of the present invention, there is provided a method of operating an optical communications system comprising a wavelength-dependent optical router, a plurality of terminals, each terminal including at least one wavelength-tuneable optical transmitter, at least one passive optical network interconnecting the plurality of terminals via the wavelength-dependent optical router, and a network controller including at least one tuneable optical receiver, the method including transmitting to terminals, in a signalling phase, network control signals identifying transmission slots allocated to respective terminals in a subsequent data transmission phase, characterised in that one or more of the terminals are each allocated a plurality of transmission slots for communication with a plurality of other terminals within a single data transmission frame.

BRIEF DESCRIPTION OF THE DRAWINGS

Systems embodying the present invention will now be described in further detail, by way of example only, with reference to the accompanying drawings, in which:

FIG. 1 is a schematic of a network embodying the invention;

FIG. 2 is a timing diagram for downstream signalling;

DETAILED DESCRIPTION OF EXEMPLARY EMBODIMENTS

Figure 3:
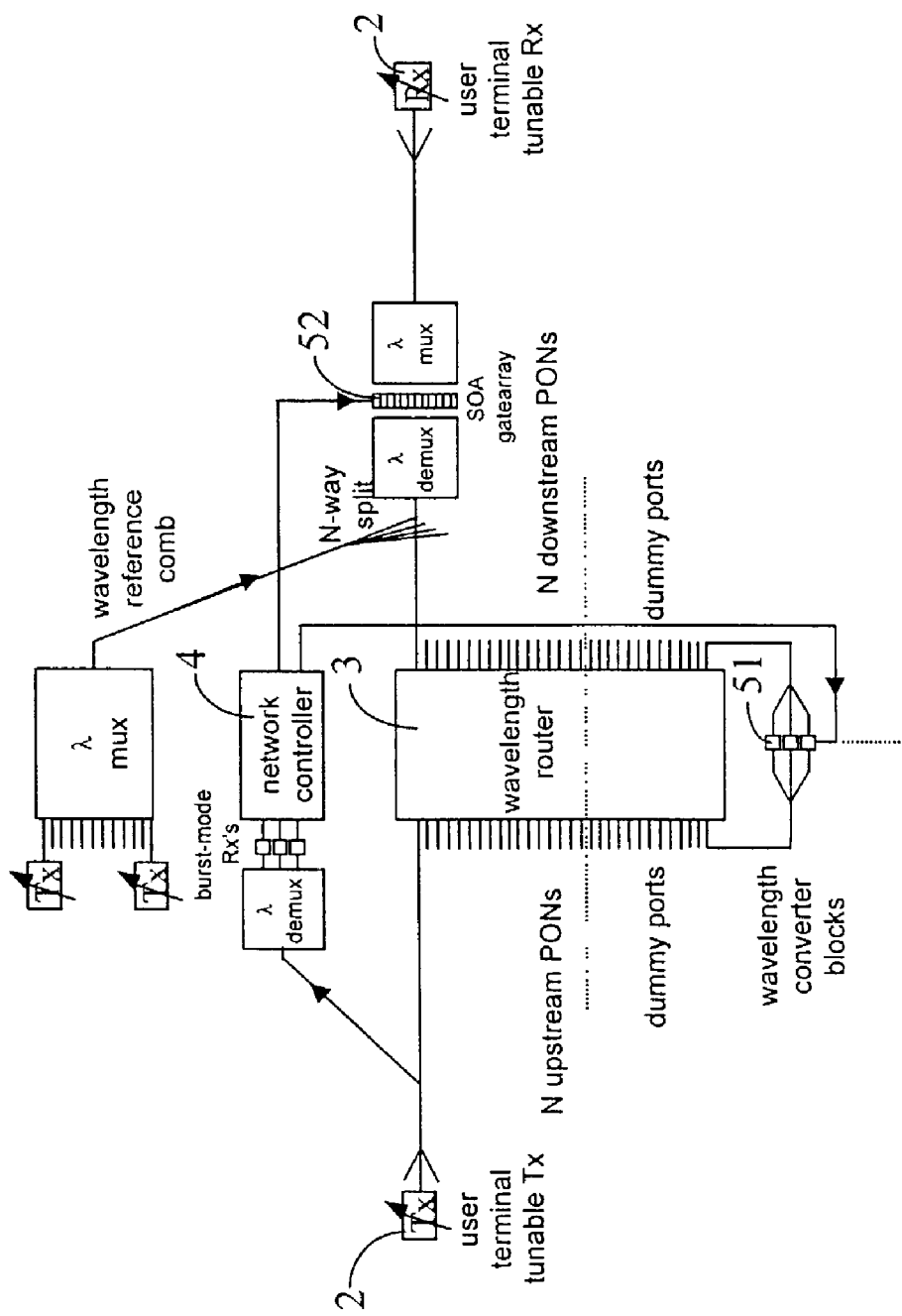
FIG. 3 is a diagram showing in further detail the network of FIG. 1.

An optical telecommunications system comprises a plurality of transparent passive optical networks (TON1, TON2 . . . TON$_N$). The TONs are connected in a star topology. A plurality of terminals 2 are connected to the TONs. Each terminal includes a transmit stage T arranged to select a time slot and wavelength channel for outgoing signals, and a receive stage R arranged to receive signals in a particular time slot and wavelength channel. Both the transmit stage and the receive stage are tuneable to operate at different wavelengths at different times. At the hub of the system, the TONs are connected to a wavelength-dependent router 3. A network controller 4 is also located at the hub of the network.

The terminals may be located at customer premises or maybe employed at an intermediate network station where customer traffic has already been aggregated and multiplexed. For example, the terminal may be located in the vicinity of a number of customer residences (a fibre to the kerb (FTTK) configuration), or in a street cabinet (fibre to the cabinet (FTTCab)) or in a local exchange (FTTExch).

The tuneable wavelength source in the transmit stage of each terminal may be, for example, a tuneable multi-section DBR (distributed Bragg reflector) commercially available from Altitune or a grating-assisted vertical coupler laser device.

Although for ease of illustration in FIG. 1, a single TON is shown connected to each group of terminals, in practice a pair of such networks is used, one for downstream signals and one for upstream signals. In operation, a terminal wishing to transmit data to another terminal located elsewhere on the network transmits to the network controller a request for one or more transmission slots. From all the requests received from the different terminals, the network controller determines an allocation of timeslots and wavelength channels. The controller returns to the terminals data indicating to each terminal the time and wavelength slot allocated to it for communication with a specified other terminal. Then, in the next transmission frame, the terminal sets its tuneable laser to the appropriate wavelength value, and transmits data in the allocated timeslot. The resulting signal is received by the wavelength-routing device which routes the received signal onto the TON in which the destination terminal is located. Wavelength converters connected to dummy ports of the routers provide some active control over routing, overcoming traffic blocking problems by making more than one wavelength channel available for transmission between a given pair of TONs.

FIG. 2 is a timing diagram showing the timing of transmissions in the downstream direction, that is from the hub to the terminals. The network employs two signalling phases. A first signalling phase, termed the meta-signalling phase (MP) is used for the transmission from the network controller to each terminal on the network of a signal indicating the wavelength channel to be used by a respective terminal to receive data in the second signalling phase (SP). Each terminal is assigned a specific wavelength channel and timeslot to be used during the meta-signalling phase when the terminal is initialized. In general, this allocation of timeslot wavelength channel for the meta-signalling phase remains fixed, being changed when the terminal is brought into or out of service. Subsequent re-allocations of the wavelength channel is possible for management purposes, however on a much longer time scale than the frame duration. By contrast, the wavelength channel used for the second signalling phase (SP) can be changed for each successive frame. In general, each of the wavelength channels available on the network, is used in the second signalling phase SP to communicate data to a sub-set of the terminals. As is described in further detail below, the allocation of wavelength channels to terminals is carried out to make most effective use of the capacity available on the network.

Following the signalling phase, a data phase (DP) comprising 1000 time slots S1, S2 . . . . . S1000 is used to communicate traffic between terminals.

The exemplary embodiment is now described in further detail with reference to an implementation in which the system carries traffic on 800 high density wavelength division multiplexed (HWDM) channels and in which 800 TONs (400 upstream and 400 downstream) are used to carry traffic from 50,000 terminals per TON pair. It should be understood that these numbers are given by way of example only, and the invention might equally be applied to larger or smaller systems, such as a fibre to the cabinet (FTTCab) system with 320,000 terminals.

FIG. 3 shows some of the key elements of FIG. 1 in greater detail. In particular, it shows that the passive wavelength-dependent routing device 3 in this example is a N×N wavelength router connected to N upstream PONs on one side and N downstream PONs on the other side. An appropriate device is the Stimax™ configuration router available commercially from Instruments SA. This uses a planar diffraction grating to cross-connect signals between arrays of optical fibre waveguides. The wavelength router also includes a number of dummy ports each connected to a respective wavelength converter and allowing flexible re-allocation of wavelength channels through the router. The use of dummy ports is described in further detail in our above-cited international patent application WO 95/26592. The controller may comprise an appropriate computing platform, such as a UNIX workstation or a dedicated electronic processor, that controls electro-optic modulators used to modulate outgoing signalling information, and that also receives signalling input from burst mode optical receivers.

FIG. 3 shows one of the tuneable transmitters connected to a respective upstream PON and one of the tuneable receivers connected to a respective downstream PON. Often, the transmitter and receiver will be co-located in a single terminal, but in some implementations, at least some terminals may have receivers only or transmitters only.

The principle employed in the network of FIG. 3 is to broadcast signalling information on each of the 800 wavelength channels, but with each channel broadcasting to only a group of terminals, rather than the entire PON. The terminal groupings allocated to each wavelength channel change from frame to frame. Each wavelength is broadcast to 50,000/800=63 terminals on average. The signalling information to each terminal comprises up to 1,000 sets of time-slot connection data, since any terminal could be allocated up to 1,000 slots in a frame. However, each wavelength only needs to transmit 1,000 sets of slot data in total. Each slot may have a different source terminal for the receiver and a different destination terminal for the transmitter. The bits required for each slot are:

5 bits downstream data slot header 16 bits source/destination terminal to receive signalling data 25 bits destination/source terminal address 10 bits allocated wavelength identifier 10 bits allocated time-slot identifier This data slot is assumed to be 9 bytes long. There are 1,000 of these data slots within a downstream reply packet. So each wavelength must transmit 2×1,000×9=18 kbytes within each frame, ie every wavelength channel must devote 18,000×8×100=14.4 Mbit/s to signalling, assuming a 10 ms frame duration. This represents only 2.3% of the capacity of the network.

Before this main signalling information can be transmitted, the 50,000 terminals on a PON are first indicated, in the meta-signalling phase, which of the 800 wavelength channels to tune to in order to receive the main signalling information, ie which group of terminals they have been allocated to. On each wavelength channel the controller transmits meta-signalling to 50,000/800=63 terminals. By always meta-signalling to the same set of terminals at each wavelength, there is no need to identify which terminal is being addressed, since they can always be addressed in sequential order. The meta-signalling capacity required on each wavelength channel is therefore very small: 63.10 bits/frame (assuming 10 bits for the wavelength identity)=79 bytes/frame=79.8.100=63.2 kbit/s. The total downstream signalling bit-rate per channel is therefore 14.46 Mbit/s, which still represents only 2.3% of the network capacity.

As noted above, each wavelength channel transmits the main signalling information to 63 terminals (on average). But it may need to transmit to just 1 terminal, if that terminal is allocated 1,000 time-slots in a frame by the network controller, or, at the other extreme, to as many as 1,000 terminals, if each terminal has only 1 time-slot allocated to it. A partitioning algorithm is used to allocate groups of terminals to each wavelength channel. There are 800,000 sets of slot data to be transmitted by the 800 wavelength channels, so each wavelength can transmit 1,000 sets to its allocated group of terminals.

The allocation algorithm is as follows. Starting with the first wavelength channel, we go through each terminal in turn using the $U_{tx}$ or $U_{rx}$ matrices, adding up the total number of time-slots allocated to them by the Network Controller. The $U_{rx}$ and $U_{tx}$ matrices map respectively receiving and transmitting terminals to wavelength channels and time slots for the data transmission phase. When the total exceeds 1,000, no more terminals can be allocated to that wavelength channel. The excess number above 1,000 is carried forward into the next group for the next wavelength channel. The process starts again, until the next channel's 1,000 slots have been allocated to terminals. This continues until each wavelength has been allocated its group of terminals. With this algorithm, it is possible for a given terminal to be in two groups (ie two different wavelength channels). It may therefore be necessary to transmit the signalling twice, so that each terminal can tune to each of the two wavelengths in turn (if it has only one tunable receiver). There is no need to transmit the identity of the second wavelength channel to tune to during meta-signalling, because it can be assumed to be the next one in order. Signalling would in this case represent 4.6% of the network capacity. Alternatively, with two tunable transmitters and receivers per terminal, signalling information would only need to be transmitted once, remaining at 2.3% of network capacity.

800 wavelength channels are needed in each PON for signalling, either for 2.3% or for 4.6% of the frame duration. The remainder of the frame is for customer data. There are several ways in which the 400.800=320,000 sources of light required can be obtained and modulated, with differing additional costs. One possibility is to provide 320,000 additional light sources. This would be very expensive, although only a fraction of the cost of e.g. 20,000,000 user terminals. FIG. 3 shows several alternative approaches for the sources and their modulation.

A lower-cost approach uses the tunable lasers in the user terminals themselves. Within each PON a sub-set of 800 of the 50,000 terminals transmits preferably a continuous wave signal for the duration of the downstream signalling period. This ensures no additional cost for the light sources, but it requires 2.3% or 4.6% of the upstream capacity of the network to be lost to provide the unmodulated light for downstream signalling. The wavelength router would connect 400 different wavelengths directly into the downstream PONs, and a further 400 wavelengths into each dummy port, whence they can also be connected into the downstream PONs. These channels are then modulated with the appropriate downstream signalling information.

A slightly less cost-effective method of generating the unmodulated wavelength channels for each downstream PON employs a single wavelength reference comb using only 800 light sources, whose power is then split 400 ways. Each of the 400 multiplexes would be coupled or switched into one of the downstream PONs.

These two methods could be combined. For example, the reference comb could generate just 400 wavelengths per PON, while the remaining 400 are generated by the user terminals.

Modulation of the 320,000 CW channels could be performed in two ways. The switchless network would already demultiplex those channels that pass through the dummy ports into separate channels at the wavelength converters. For these channels, modulation is performed by the wavelength converters 51 (preferably, to avoid additional costs), or by additional modulators. Those channels that are connected directly into the downstream PONs can be modulated by means of an SOA (semiconductor optical amplifier) array 52 sandwiched between a wavelength multiplexer and demultiplexer, one such system being deployed for each PON. A like system is used in the upstream PONs. This would demultiplex the channels, modulate each one in an SOA, then remultiplex them. If SOA array technology is employed within a dispersive optical system, then there is no need for each channel to have its own fibre termination. Only the complete SOA array would need to be aligned in the packaging process, which helps to keep costs down. At most there would be 320,000 SOA modulators required for signalling. In the rest of the network amplifier gating could be required for every 160 user terminals assuming 622 Mbit/s operation, ie (20,000,000/160)×800=100 million SOA gates (ie 5 per user terminal). The additional SOA cost is only 0.32%.

There is described above how wavelength channels are modulated with downstream signalling information. Even if the user terminal tunable transmitters themselves are used as light sources for downstream signalling, the network controller must still modulate 320,000 channels, ie 800 in each PON. An approach using optical delay lines may be employed to reduce the number of modulators required.

Each downstream signalling reply packet contains 2,000 9-byte data slots. There are 200 slots to allow for each terminal receiving on two different wavelength channels in sequence. These 18 kbytes last 231.5 µs at 622 Mbit/s. A guard-band of 2.2 µs must be added to this, making 233.7 µs packet duration. The signalling must be transmitted twice, so the total duration of the downstream signalling is 467.4 µs. Given this duration, it is possible for just 40 tunable light sources and associated modulators to be used in each PON for downstream signalling, transmitting in 10 ms/467.4 µs≈=20 sequential slots (with frame duration of 10 ms). These slots are sub-frames of the second signalling phase. The channels are generated by the tunable light sources in different blocks of 38 wavelength channels within each sub-frame. The tuneable light sources are then tuned to the next block of wavelength channels for the next sub-frame, and so on, until an entire frame has been filled. Optical delay lines are used, to cause the blocks of wavelength channels within the different time-slots to be delayed relative to each other so that they completely overlap each other in time by the end of a frame, i.e. so that the different sub-frames are aligned in the time domain. The unit of delay being 467.4 µs, the fibre delay lines need to be 93.5 km long. Each PON has 20 delay lines. The longest delay would be for 19 re-circulations. This process is complementary to that in the upstream direction described in further detail below, where the blocks of wavelengths are spread out in time by the delay lines, rather than compressed as here.

Altogether the total number of tunable transmitters needed at the network controller for downstream signalling in this way is 400×40=16,000. This is only 0.08% of the tunable transmitter costs in all the user terminals; a negligible additional cost. No additional modulators (or SOAs) are required. There is now no need to use the user terminal transmitters to supply optical power for downstream signalling, so upstream transmission efficiency is improved.

Figure 6:
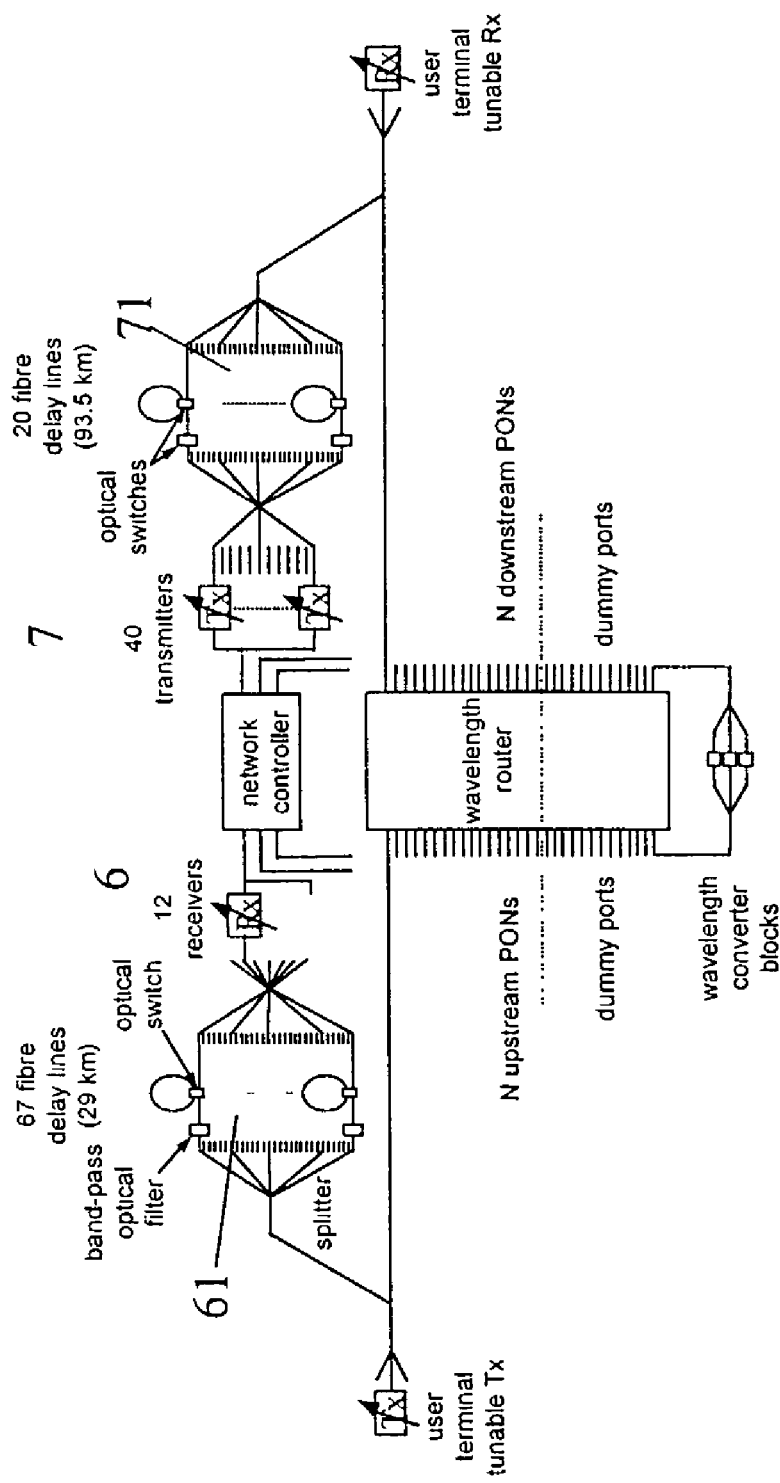
FIG. 6 is a diagram showing an alternative embodiment employing optical delays in both upstream and downstream signalling.

FIG. 6 shows the optical arrangements for each PON to minimise transmitters and receivers for both upstream and downstream signalling, when using 800 wavelength channels. Twelve burst-mode opto-electronic receivers 6 receive upstream optical signals via a 67-way splitter/delay network. Similarly, for the downstream PON's, 40 transmitters 7 output signals to the user terminals via a 20-way splitter/delay network.

Conventional signalling techniques allow a terminal to request packets to only a single destination terminal in each frame. This would be acceptable e.g. for telephony, if handled as TDMA circuits. Different destinations would be set up and cleared down one at a time in each frame. But, for connectionless operation, it is advantageous to provide for multiple destinations to be set up within a single frame's request packet. The techniques described here provide sufficient capacity to accommodate the necessary upstream signalling.

In each PON, (T/N)=20,000,000/400=50,000 terminals may wish to transmit up to F=1,000 destination addresses per frame, each requiring $\log_2 T$=25 bits, ie 50,000×1,000× 25=1.25 Gbits. With (1/Fτ)=100 frames per second, this needs 125 Gbit/s upstream signalling capacity within each PON. (τ is the time-slot duration and F is the number of time-slots per frame). This would be (125/(800×0.622))× 100%=(125/497.6)×100%=25.1% of the entire network capacity. So it would be possible to provide complete freedom of requests in every frame. Nevertheless, if connectionless operation were to become predominant, this would be rather a high proportion of the network's capacity for upstream signalling. Interestingly, when such complete freedom is allowed to request and set up packets to 1,000 different destinations per frame, it is the upstream signalling requirement that dominates over the downstream signalling requirement, ie 25.1% vs 2.3% or 4.6% of network capacity.

More explicitly, the upstream signalling ratio (proportion of network capacity) is given by $$\frac{\log_2 T (T/N)(F/F\tau)}{(N+d+r)B} = \frac{\log_2 T}{2\tau b} = 0.25$$

when the values for the total number of wavelength channels and router ports (N+d+r) are inserted for a "switchless" network. This ratio is independent of the number of time-slots F in the frame and the number of PONs N. It is in effect the ratio of the number of address bits per time-slot request to the average number of user data bits per time-slot. There are two ways of reducing this signalling ratio; to use longer time-slots τ or to provide greater average capacity per terminal b. Longer time-slots would cause greater difficulties for coding and other delays, and should probably be avoided. If the average terminal rate b were increased, this would represent a greater network capacity. Unless the operational bit-rate B were also increased in proportion, the numbers of wavelength channels and router ports would become very large. Let us investigate b=20 Mbit/s and B=2.5 Gbit/s. This enables the numbers of wavelength channels and router ports to remain unchanged at 800 and 400 respectively. The total network capacity becomes 800× 400×2.5 Gbit/s=800 Tbit/s, and the signalling becomes just 25/4=6.25% of the network capacity.

However, of course if the time-slot duration is not reduced when the bit-rate B is increased, the number of bits within each packet rises. The coding efficiency e.g. for telephony will therefore be reduced.

Hence by increasing the total capacity of the network, which involves increasing both the operational bit-rate B and the average bit-rate per terminal b, it is possible to reduce the upstream signalling ratio to an acceptable level, without having to increase the numbers of wavelength channels or router ports. The additional cost of doing so would be predominantly due to the reduced upstream split to the first amplifier, which would go down from around 160 at 622 Mbit/s to around 32 ways at 2.5 Gbit/s. We would also need 800/32=25 SOA gates for every terminal for amplifier gating instead of 800/160=5. The additional cost penalty due to the reduced coding efficiency, particularly for low bit-rate services like telephony, must also be taken into account.

The above analysis for allowing signalling requests to more than one destination in each frame applies to FTTH, where there are for example 20,000,000 terminals, but only 320,000 of which can transmit in a given time-slot. However, for FTTCab etc. the signalling ratio would be much lower, because there would be far fewer terminals making requests, eg 320,000 if 800 wavelengths are fully used in each of 400 PONs. For 320,000 terminals the ratio becomes $$\frac{\log_2 T}{2\tau h} = \frac{19}{2\tau B} = 0.0015$$

Because the number of terminals is now the same as the number of wavelength channels in the network, the average terminal bit-rate b is now the same as the operational bit-rate B, and the signalling ratio is only 0.15%. Hence for FTTK, FTTCab or FTTExch it is possible for the terminals to signal requests to up to 1,000 different destinations in each frame with very small signalling inefficiency. This is advantageous because these terminals must handle the traffic of perhaps hundreds of customers, which will involve far more connection requests than from a single FTTH customer.

Approaches to upstream signalling, that is from the terminals to the hub of the network, will now be described. Use is made of all of the 800 wavelength channels for upstream signalling. This removes any need for a second, fixed-wavelength transmitter at the user terminals. Just the one tunable transmitter at each user terminal is shared between signalling and data traffic by putting the signalling with the customer data slots.

Figure 4:
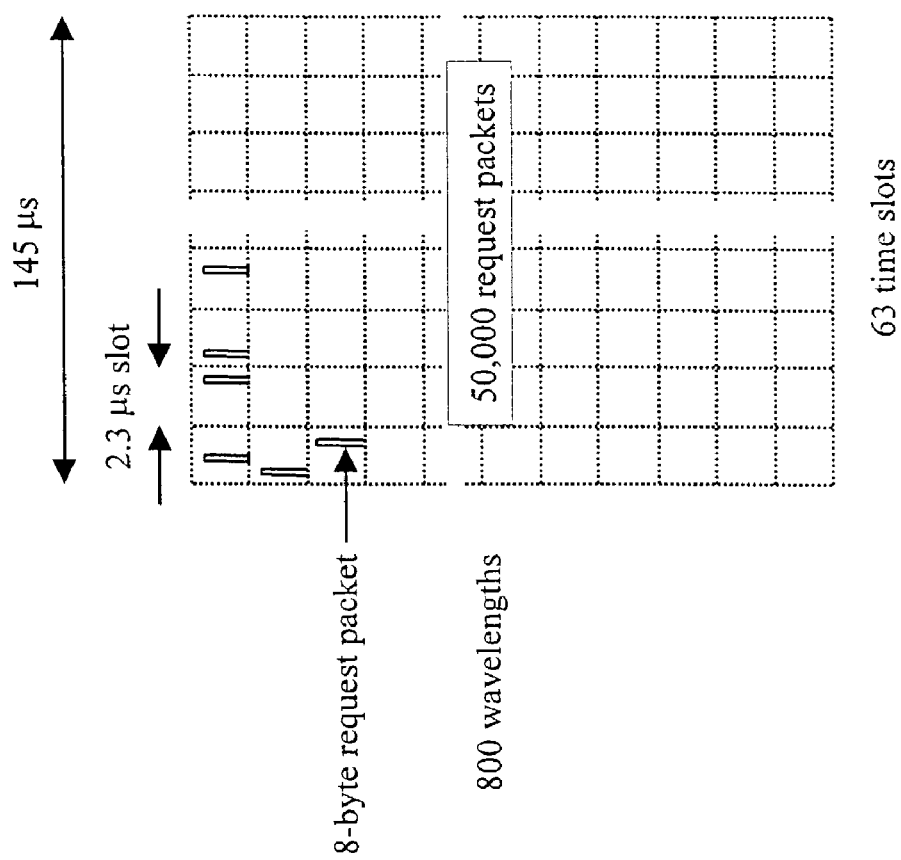
FIG. 4 is a timing/wavelength diagram for upstream signalling.

Each request packet is only 8 bytes long. At 622 Mbit/s this takes only 103 ns. However, each one of 50,000 terminals must transmit its request packet within a frame duration of 10 ms, if all terminals are to be allowed a request in every frame. Each request packet is therefore independently generated by each terminal, so the duration of each packet must be extended to accommodate the guard-time. This can be around 2.2 µs. So each mini-slot for request packets must last for 2.2+0.103=2.3 µs. Because the same transmitter must be used for data and signalling, every terminal should ideally transmit request packets simultaneously. Otherwise, the Network Controller will need to perform a more complicated algorithm to allocate data time-slots to terminals, taking into account the different slots in which each terminal is unavailable for data transmission while signalling. Since there are 800 wavelength channels available, groups of 800 terminals can signal simultaneously, followed by subsequent groups of 800, until 50,000/800=63 different groups of terminals have transmitted in 63 sequential time-slots. This takes only 63×2.3=145 µs, which is equivalent to only around 15 data time-slots of the 1,000 within a frame. The upstream signalling is therefore only 1.5% of the upstream network capacity. FIG. 4 shows the structure of the upstream signalling packets.

Although the upstream signalling is very efficient when all 800 wavelength channels are employed for signalling, we would need 800 tunable burst-mode receivers in every PON, ie 320,000 altogether, unless some more intelligent approach to receiving the signalling packets is employed. 320,000 is only a small proportion of the 20,000,000 user terminals, so the network cost would only be increased by 1.6% if a better approach were not employed.

At the other extreme, if we tried to use just one tunable, burst-mode receiver in each PON, we would need to translate the 800 simultaneous sets of 63 sequential request packets into one sequential stream of 50,000 packets. But this would last for 50,000×2.3 µs=115 ms, which is 11.5 frames: This is far too long. In order to limit the duration to 1 frame, we would need to have 12 separate tunable, burst-mode receivers for signalling in each upstream PON. This would require sets of 800/12=67 wavelength channels to be translated from simultaneous transmission to sequential reception at a single receiver. In each set of 67 channels, each channel would have to be delayed relative to the others in units of 63×2.3 µs=145 µs, with up to 67 different delays (ie 0 to 67×145 µs=9.715 ms).

Figure 5:
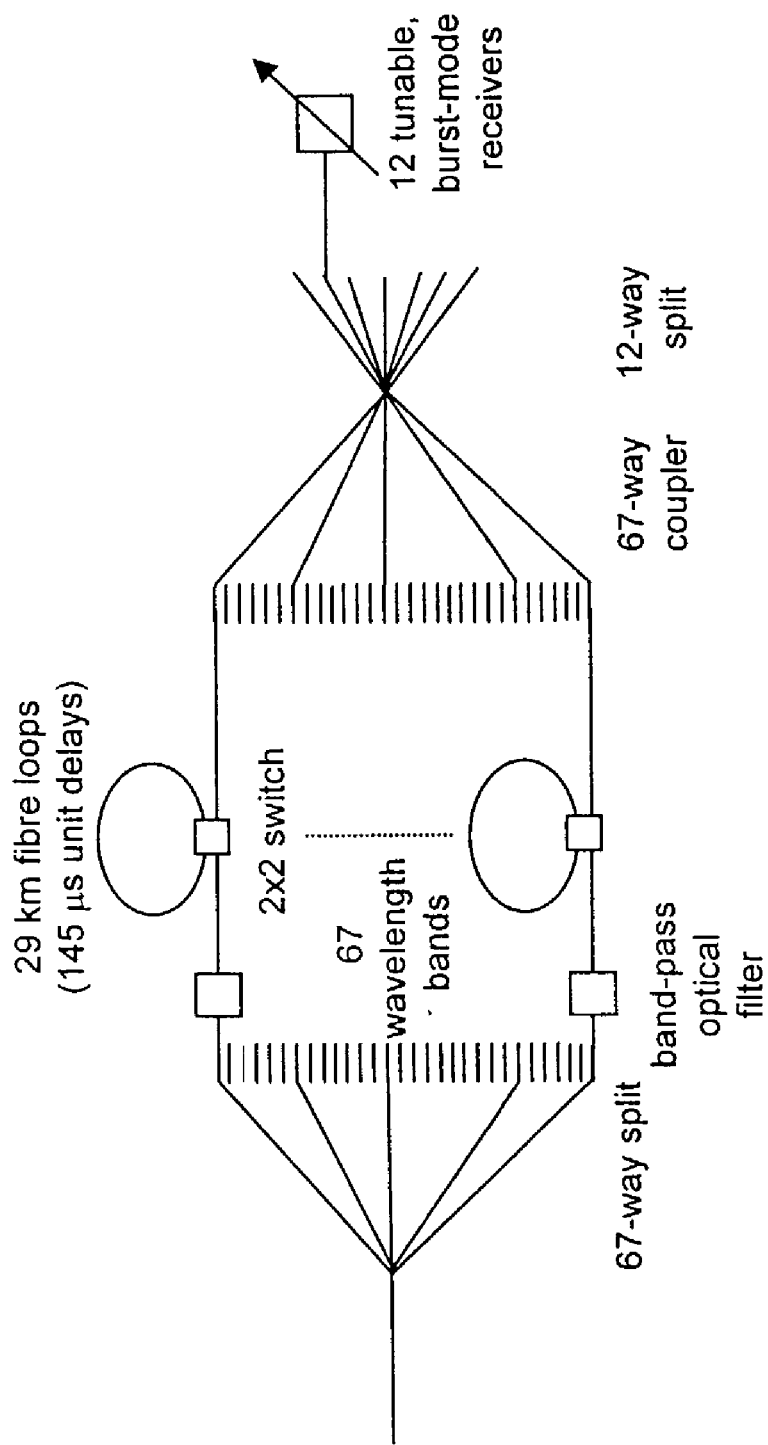
FIG. 5 is a diagram showing the use of optical delays at the controller receivers.

FIG. 5 shows a possible optical arrangement for minimising the required number of tunable, burst-mode receivers for signalling in each upstream PON. At the network controller, the upstream PON fibre is split into 67 separate wavelength bands, each containing 12 different wavelength channels, by means of band-pass optical filters. Each band is delayed by units of 145 µs with respect to each other band, eg by the use of 29 km of optical fibre. To obtain different multiples of 145 µs, each band is allowed to propagate a different integer number of times around its 29 km fibre delay line, using 2×2 optical switches. The delayed wavelength bands are then split 12 ways. This 12-way split allows each of 12 tunable, burst-mode receivers to select one of the resulting 12 sets of simultaneous wavelength channels.

Altogether the total number of tunable, burst-mode receivers required for upstream signalling is just 12×400=4, 800, which is a large reduction on the worst-case of 320,000, providing a large saving in the cost of receivers.

The invention claimed is:

1. A method of operating an optical communications system comprising a wavelength-dependent optical router, a plurality of terminals, each terminal including at least one wavelength-tuneable optical transmitter, at least one passive optical network interconnecting the plurality of terminals via the wavelength-dependent optical router, and a network controller, the method comprising:
   a) transmitting data time-slot request packets to the network controller from the plurality of terminals on a number of different wavelength channels in a common signalling time slot within a data transmission frame alone a path which bypasses said wavelength-dependent router;
   b) applying different respective delays in the optical domain to said slot request packets on different wavelength channels thereby creating one or more time-series of request packets;
   c) receiving said time-series of slot request packets at a common optical receiver; and
   d) at the network controller, processing requests received from the optical receiver and allocating transmission slots in a subsequent data transmission frame to terminals.

2. A method as in claim 1, in which the optical communications system is carrying high-density wavelength division multiplexed (HWDM) traffic on N different wavelength channels.

3. A method as in claim 2, in which substantially all of the said N different wavelength channels are used in transmitting slot request packets.

4. A method as in claim 2, in which the number of terminals is T, where T>>N, and where a plurality of different terminals transmit slot request packets on the same wavelength channel.

5. A method as in claim 1, in which step (b) includes, for each of a number R of wavelength channels within a respective one of a number of wavelength bands, applying a common delay to the slot request packets, and in which, in step (c), R time-series of slot request packets are received at R respective optical receivers.

6. A method as in claim 1, including, in step (d), communicating, to a terminal, control signals allocating at least two different time-slots for communication between the said terminal and a plurality of other terminals within a single data transmission frame.

7. A method as in claim 1, including generating control signals, for transmission from the network controller to the terminals, in a sequence of sub-frames, and applying different respective delays to control signals generated at N different sub-frames, thereby aligning all the sub-frames in the time domain.

8. A method of operating an optical communications system comprising a wavelength-dependent optical router, a plurality of terminals, each terminal including at least one wavelength-tuneable optical receiver, at least one passive optical network interconnecting the plurality of terminals via the wavelength-dependent optical router, and a network controller including a plurality of optical transmitters, the method comprising:
   (a) generating control signals, for transmission from the network controller to the terminals, in different sub-frames within a downstream signalling frame along a path which bypasses said wavelength-dependent optical router; and
   (b) applying different respective delays to said control signals generated in different respective sub-frames thereby aligning all the sub-frames in the time domain.

9. A method of operating an optical communications system comprising a wavelength-dependent optical router, a plurality of terminals, each terminal including at least one wavelength-tuneable optical transmitter, at least one passive optical network interconnecting the plurality of terminals via the wavelength-dependent optical router, and a network controller including at least one tuneable optical receiver, the method comprising:

a) transmitting to terminals, in a signaling phase along a path which bypasses said wavelength-dependent router, network control signals identifying transmission slots allocated to respective terminals in a subsequent data transmission phase; and allocating at least one of the terminals to a plurality of transmission slots for communication with a plurality of other terminals within a single data transmission frame.

10. A network controller arranged to operate by a method in accordance with claim 1.

11. A terminal arranged to operate by a method in accordance with claim 1.

12. An optical communications system including a network controller and a plurality of terminals arranged to operate by a method according to claim 1.

13. An optical communications system comprising a wavelength-dependent optical router, a plurality of terminals, each terminal including at least one wavelength-tuneable optical transmitter, at least one passive optical network interconnecting the plurality of terminals via the wavelength-dependent optical router, and a network controller, the system being configured to operate according to a method which comprises:

(i) transmitting data time-slot request packets to said network controller from the plurality of terminals on a number of different wavelength channels in a common signalling time slot within a data transmission frame along a path which bypasses said wavelength-dependent router;

(ii) applying different respective delays in the optical domain to said slot request packets on different wavelength channels thereby creating one or more time-series of request packets;

(iii) receiving said time-series of slot request packets at a common optical receiver; and (iv) at the network controller, processing requests received from the optical receiver and allocating transmission slots in subsequent data transmission frames to terminals along a path which bypasses said wavelength-dependent router.

* * * * *